United States Patent [19]

Bourguignon et al.

[11] Patent Number: 4,480,959
[45] Date of Patent: Nov. 6, 1984

[54] DEVICE FOR DAMPING VIBRATIONS OF MOBILE TURBINE BLADES

[75] Inventors: Serge P. L. Bourguignon, Saint Sauveur sur Ecole; Raymond R. Choque, Hericy; Lucien P. Pham, Le Mee sur Seine, all of France

[73] Assignee: S.N.E.C.M.A., Paris, France

[21] Appl. No.: 475,117

[22] Filed: Mar. 14, 1983

[30] Foreign Application Priority Data

Mar. 12, 1982 [FR] France ................. 82 04154

[51] Int. Cl.³ .............................................. F01D 5/32
[52] U.S. Cl. ................... 416/220 R; 416/500; 416/145
[58] Field of Search .............. 416/220 R, 500, 145, 416/219 R, 221, 193 A

[56] References Cited

U.S. PATENT DOCUMENTS

| | | | |
|---|---|---|---|
| 2,836,392 | 5/1958 | Spaeth | 416/220 R |
| 3,181,835 | 5/1965 | Davis | 416/220 |
| 3,455,537 | 7/1969 | Kozlin et al. | 416/220 |
| 3,689,177 | 9/1972 | Klassen | 416/220 R |
| 3,768,924 | 10/1973 | Corsmeier et al. | 416/220 |
| 3,887,298 | 6/1975 | Hess et al. | 416/500 |
| 4,021,138 | 5/1977 | Scalzo | 416/220 R |
| 4,108,571 | 8/1978 | Mawson | 416/221 |
| 4,192,633 | 3/1980 | Herzner | 416/500 |

FOREIGN PATENT DOCUMENTS

| | | | |
|---|---|---|---|
| 2324873 | 4/1977 | France | 416/220 |
| 2413542 | 7/1979 | France | 416/220 |

Primary Examiner—Henry C. Yuen
Assistant Examiner—John Kwon
Attorney, Agent, or Firm—Oblon, Fisher, Spivak, McClelland & Maier

[57] ABSTRACT

A device for damping vibrations of mobile turbine blades, in which the roots of the blades are engaged in recesses distributed over the periphery of a rotor disk on which is anchored, under the rim of the disk, a leading edge flange consisting of sections and a trailing edge flange consisting of a single annular part against which the blade roots and the teeth of the disk rest. Between the root of a blade and the bottom of the recess of the disk is placed, behind the forward flange, a shim in the shape of a wedge which, under the action of centrifugal force, exerts on the blade a force that causes the blade to slide axially so that it contacts trailing edge retaining flange.

2 Claims, 3 Drawing Figures

U.S. Patent   Nov. 6, 1984   4,480,959
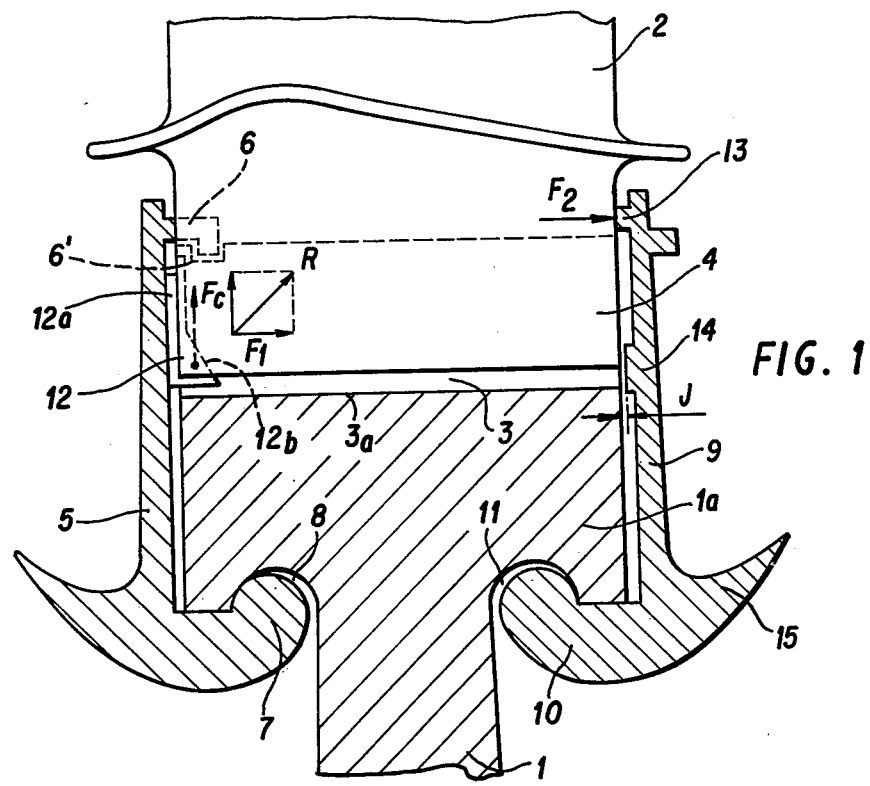
FIG. 1
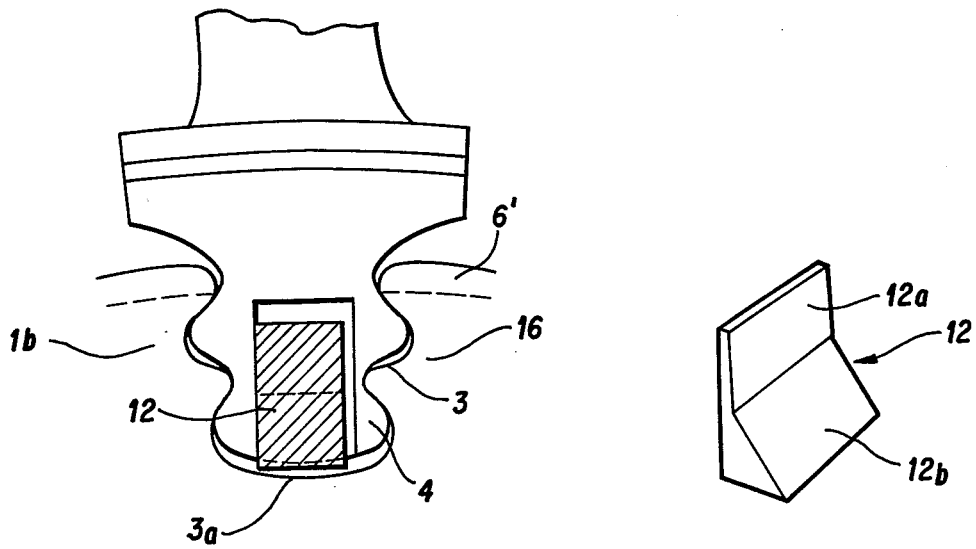
FIG. 2
FIG. 3

DEVICE FOR DAMPING VIBRATIONS OF MOBILE TURBINE BLADES

BACKGROUND OF THE INVENTION

1. Field of the Invention

This invention has as its object a device for damping vibrations of mobile turbine blades.

2. Description of the Prior Art

Turboshaft engines that exhibit high performance have high pressure turbine blades which are generally locked axially on a rotor disk by two flanges; this to prevent gaps between the blades and the disk and to assure air tightness for cooling the blades.

According to a known embodiment, the forward flange consists of a plurality of sections anchored between teeth of the disk and under a rim portion thereof. The rear or trailing edge flange consists of a single annular part, anchored under the rim of the disk and constituting a support for the blade roots and the teeth of the disk. Since the axial length of the blade roots is affected by tolerances, the trailing edge flange does not rest on all the blades and, consequently, some blades can vibrate in their housing and break prematurely.

SUMMARY OF THE INVENTION

The device according to the invention has its object to make it possible to assure the contact of all the blades with the rear flange which can then act as a damping element.

According to the invention, between the root of the blade and the bottom of the recess of the rotor disk is placed a shim or block in the shape of a wedge behind a first flange working with a leading edge face portion of the rotor disk. The first flange comprises a plurality of sections that extend and rest on the leading edge faces of two blade roots at most, and which, under the action of centrifugal force exerts on the blade a force that causes it to slide axially so that it contacts a second flange working with the trailing edge face of the disk. The second flange consists of a single, annular part forming a retaining flange.

This arrangement makes it possible to obtain a force of reaction from the flange which dampens the vibrations of the blades.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is an elevational view of the damping device for blades according to the present invention, FIG. 2 is a view in cross section of the wedge or block mounted between the bottom of the recess of the rotor disk and the root of the blade, FIG. 3 is a view in perspective of the shim or block in the shape of a wedge.

DETAILED DESCRIPTION OF THE PREFERRED EMBODIMENTS

In FIG. 1 is shown a part of a rotor disk 1 carrying mobile turbine blades 2, rotor disk 1 exhibiting a plurality of recesses 3 (FIG. 2) in which the roots 4 of the blades 2 are engaged and radially locked. On the leading edge face of disk 1 is mounted a leading edge flange 5 which has an annular flange 7 extending in the direction of the rotor disk 1 and which is engaged in a circular groove 8 formed in the inner periphery of part 1a of the rotor disk. The flange 5 includes a plurality of sections that are extended and that rest on the leading edge faces of the roots of at most two blades. Each section has on its periphery at least one hook 6 that is engaged, during assembly, between two teeth 16 of the rotor disk 1, and is made to slide peripherally a half pitch in a groove 6' made for this purpose in a radial outer portion of each tooth 16 of the rotor disk 1.

On the rear face of rotor disk 1 is mounted a trailing edge flange 9 consisting of an annular part forming an elastic ring slotted and anchored by a circular flange 10 which is engaged in a circular groove 11 formed in the inner periphery of rim 1a of rotor disk 1. Locking of this flange, elastically engaged on the collar that delimits groove 11, is assured by a locking key according to French published patent application No. 2,419,389.

Between root 4 of blade 2 and the bottom 3a of recess 3 of the rotor disk 1 is placed a shim or block 12 in the shape of a wedge (FIGS. 1, 2 and 3), said shim having extending therefrom a plate or flange 12a that extends between the leading edge flange 5 and the foot 4 of the blade 2.

On the inner face of trailing edge flange 9 are provided annular ribs 13 and 14.

When rotor disk 1 is rotating and the blades 2 are thereby caused to rotate, a centrifugal force Fc acts on shim 12 which exerts on the blade root a resultant force R because of its inclined face 12b by which it is in contact with root 4 of the blade, said resultant force R having a component F1 which is exerted axially on root 4 of blade 2 and forces it to slide axially in its recess 3.

The inner face of trailing edge flange 9 is machined to exhibit an average clearance J, of 0.3 mm for example, between rib 14 and the trailing edge face of rim 1a. In operation, the centrifugal forces have a resultant force located in area 15 of the center of gravity of flange 9, behind the downstream side of the rotor disk 1. This force pushes rib 14 against the rotor disk 1 and/or the blade roots 4.

Obviously, numerous modifications and variation of the present invention are possible in light of the above teachings. It is therefore to be understood that within the scope of the appended claims, the invention may be practiced otherwise than as specifically described herein.

What is claimed as new and is intended to be secured by Letters Patent of the United States is:

1. A device for damping vibrations of at least first and second mobile turbine blades, in which the roots of the first and second blades are engaged in recesses distributed over the periphery of a rotor disk having a plurality of teeth, comprising:

a first flange anchored under a first rim portion of said disk and which is operatively associated with a leading edge face of the disk and comprising sections that extend radially outward before the front faces of not greater than first and second adjacent blade roots;

a second flange mounted under a second rim portion of said disk and which is operatively associated with a trailing edge face of said disk and comprising a single annular part, a portion of which extends radially outward a distance sufficient that the blade feet may contact it; and a shim member positioned between the root of the first blade and the bottom portion of one of said recesses in the disk, also being positioned behind the first flange, said shim member being in the shape of a wedge, which, under the action of centrifugal force, exerts on the first blade a force that causes the first blade to slide axially so as to exert a force on said second flange, wherein said second flange further comprises a first rib for contacting the root of said first blade and a second rib separated by a predetermined clearance from the trailing edge of the disk.

2. A device as set forth in claim 1, wherein the shim member further comprises a plate member extending between the first flange and the root of the first blade.

* * * * *

UNITED STATES PATENT AND TRADEMARK OFFICE
CERTIFICATE OF CORRECTION

PATENT NO. : 4,480,959

DATED : November 6, 1984

INVENTOR(S) : Serge Pierre Louis Bourguignon et al

It is certified that error appears in the above-identified patent and that said Letters Patent is hereby corrected as shown below:

In column 1, line 14, before "disk" insert --rotor--;

In column 1, line 51, delete "whcn" and insert --when--;

In column 1, line 57, delete "wedge" and insert --shim--;

In column 2, line 26, delete "foot" and insert --root--;

In column 2, line 39, delete "betwen" and insert --between--;

In column 2, line 42, delete "behind" and insert --downstream of--;

In column 2, line 45, delete "variation" and insert --variations--;

In column 3, lines 1-10, margin is off.

Signed and Sealed this

Eighth Day of October 1985

[SEAL]

Attest:

DONALD J. QUIGG

*Attesting Officer*

*Commissioner of Patents and Trademarks—Designate*